United States Patent
Lee et al.

(10) Patent No.: US 11,254,354 B2
(45) Date of Patent: Feb. 22, 2022

(54) METHOD AND APPARATUS FOR CONTROLLING MOTOR OF ELECTRIC POWER ASSISTED STEERING SYSTEM

(71) Applicant: ERAE AMS CO., LTD., Daegu (KR)

(72) Inventors: Jung Il Lee, Daegu (KR); Seung Ryong Baek, Daegu (KR); Sang Seob Lee, Daegu (KR)

(73) Assignee: ERAE AMS CO., LTD., Daegu (KR)

( * ) Notice: Subject to any disclaimer, the term of this patent is extended or adjusted under 35 U.S.C. 154(b) by 194 days.

(21) Appl. No.: 16/628,175

(22) PCT Filed: Jun. 28, 2018

(86) PCT No.: PCT/KR2018/007328
§ 371 (c)(1),
(2) Date: Jan. 2, 2020

(87) PCT Pub. No.: WO2019/009565
PCT Pub. Date: Jan. 10, 2019

(65) Prior Publication Data
US 2020/0140003 A1    May 7, 2020

(30) Foreign Application Priority Data
Jul. 4, 2017   (KR) .................. 10-2017-0084615

(51) Int. Cl.
*B62D 5/04*     (2006.01)
*B62D 6/00*     (2006.01)

(52) U.S. Cl.
CPC .......... *B62D 5/0463* (2013.01); *B62D 5/0409* (2013.01); *B62D 6/00* (2013.01)

(58) Field of Classification Search
None
See application file for complete search history.

(56) References Cited

U.S. PATENT DOCUMENTS 6,789,641 B2 * 9/2004 McLaughlin ........ B62D 5/0463
                                                 180/446
9,592,849 B2 * 3/2017 Akatsuka ............ B62D 15/025
(Continued)

FOREIGN PATENT DOCUMENTS

JP      2016-088434 A     5/2016
KR  10-2005-0046726 A     5/2005
(Continued)

OTHER PUBLICATIONS

International Search Report for PCT/KR2018/007328 dated Oct. 29, 2018 [PCT/ISA/210].
(Continued)

*Primary Examiner* — Kevin Hurley
(74) *Attorney, Agent, or Firm* — Sughrue Mion, PLLC

(57) ABSTRACT

A motor control method for controlling a motor of an electric power assisted steering system includes: generating a low pass torque signal and a high pass torque signal, respectively; generating a low frequency assist torque signal using the low pass torque signal and the vehicle speed; generating a high frequency assist torque signal using a high pass torque signal and the vehicle speed; generating a torque command signal using a sum of the low frequency assist torque signal and the high frequency assist torque signal; and generating a voltage output signal for driving the motor using the torque command signal.

15 Claims, 5 Drawing Sheets

(56) References Cited

U.S. PATENT DOCUMENTS

| | | | |
|---|---|---|---|
| 10,246,123 B2* | 4/2019 | Ko | B62D 15/021 |
| 2010/0198461 A1 | 8/2010 | Burton et al. | |

FOREIGN PATENT DOCUMENTS

| | | | | |
|---|---|---|---|---|
| KR | 10-2012-0009099 A | 2/2012 | | |
| KR | 10-2015-0011144 A | 1/2015 | | |
| KR | 10-2017-0069061 A | 6/2017 | | |
| WO | WO-2019135575 A1 * | 7/2019 | | B62D 6/08 |

OTHER PUBLICATIONS

Written Opinion for PCT/KR2018/007328 dated Oct. 29, 2018 [PCT/ISA/238].

* cited by examiner

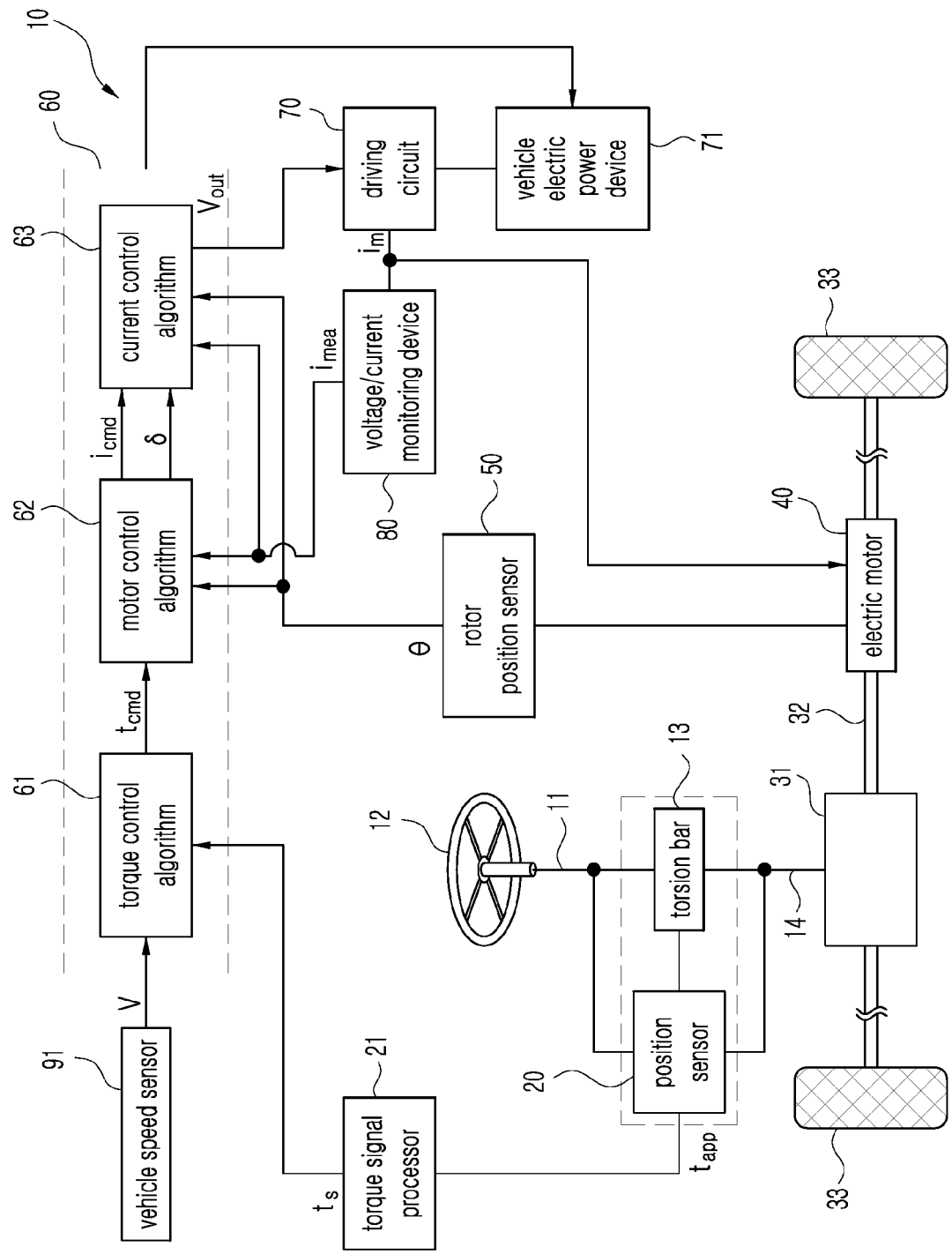
[Fig. 1]

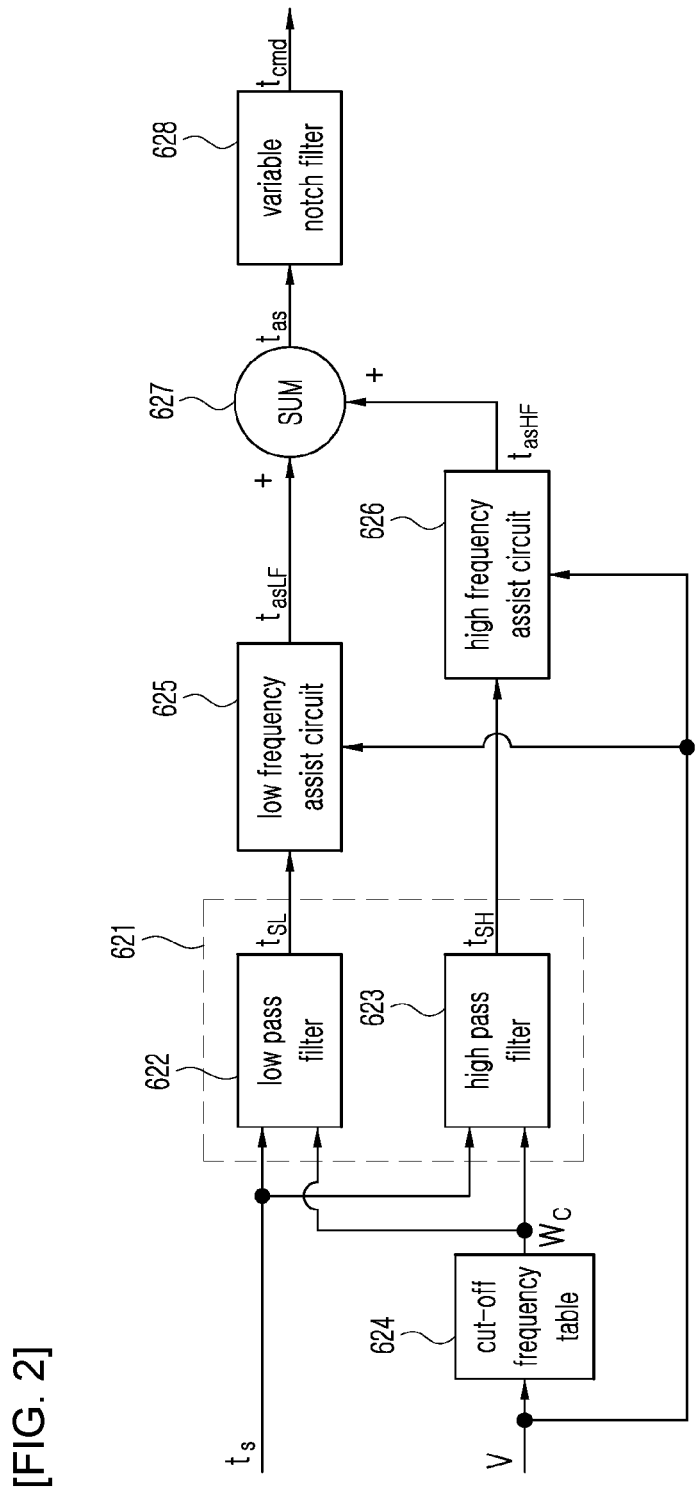
[FIG. 2]

[FIG. 3]
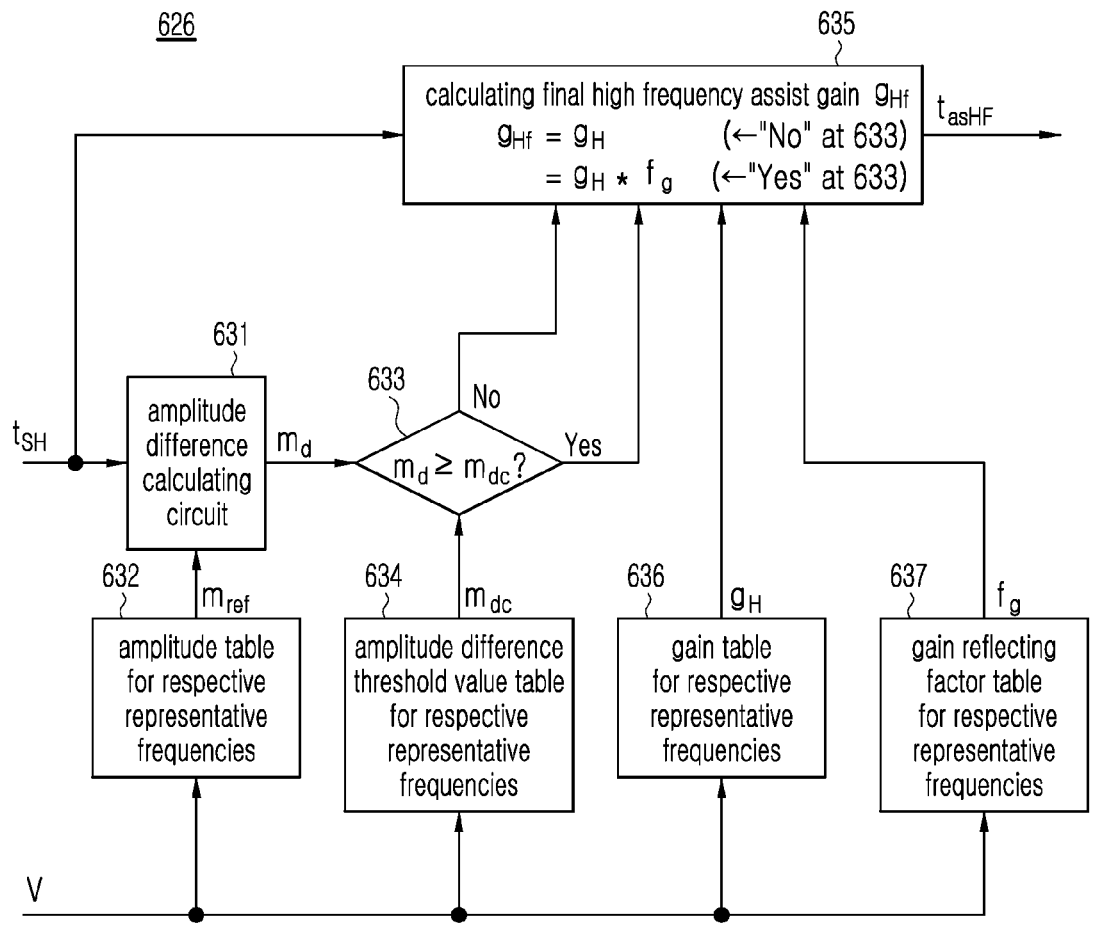
[FIG. 4]
| vehicle speed (km/h) | 0 | 0 ~ 10 | 10 ~ 30 | 30 ~ 50 | 50 ~ 80 | 80 ~ 100 | 100 ~ |
|---|---|---|---|---|---|---|---|
| cut-off frequency (Hz) | 4 | 4.5 | 5 | 5.5 | 6 | 6.5 | 7 |

【FIG. 5】

| vehicle speed (km/h) \ representative frequency (Hz) | lower frequency | middle frequency | upper frequency |
|---|---|---|---|
| 0 | 0.5 | 0.3 | 0.1 |
| 0 ~ 30 | 0.4 | 0.3 | 0.15 |
| 30 ~ 70 | 0.3 | 0.3 | 0.15 |
| 70 ~ | 0.2 | 0.3 | 0.15 |

【FIG. 6】

| vehicle speed (km/h) \ representative frequency (Hz) | lower frequency | middle frequency | upper frequency |
|---|---|---|---|
| 0 | 1.2 | 0.7 | 0.6 |
| 0 ~ 30 | 1 | 0.5 | 0.4 |
| 30 ~ 70 | 0.6 | 0.3 | 0.3 |
| 70 ~ | 0.3 | 0.2 | 0.2 |

【FIG. 7】
| vehicle speed (km/h) \ representative frequency (Hz) | lower frequency | middle frequency | upper frequency |
|---|---|---|---|
| 0 | 0.3 | 0.3 | 0.3 |
| 0 ~ 30 | 0.6 | 0.6 | 0.5 |
| 30 ~ 70 | 0.7 | 0.8 | 0.9 |
| 70 ~ | 0.8 | 0.8 | 0.9 |
【FIG. 8】
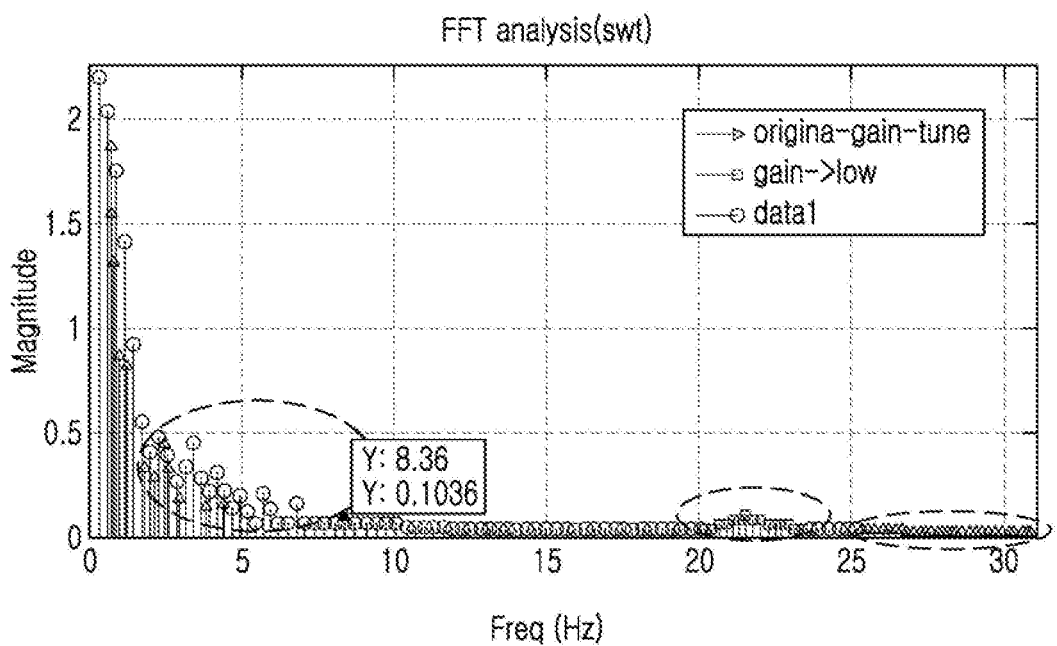

METHOD AND APPARATUS FOR CONTROLLING MOTOR OF ELECTRIC POWER ASSISTED STEERING SYSTEM

CROSS REFERENCE TO RELATED APPLICATIONS

This application is a National Stage of International Application No. PCT/KR2018/007328 filed Jun. 28, 2018, claiming priority based on Korean Patent Application No. 10-2017-0084615 filed Jul. 4, 2017.

TECHNICAL FIELD

The present invention relates to a motor control method of an electric power assisted steering system of a vehicle, and more particularly to the determination of a high frequency assist component for motor control.

BACKGROUND ART

The electric power assisted steering system is a device that provides steering assist torque that assists a drivers steering force by using the power of an electric motor and has recently been widely used in a vehicle steering device.

The electric power assisted steering system includes several algorithms for determining the steering assist torque, determines appropriate steering assist torque based on parameters such as the steering torque input by a driver, a vehicle speed, and so on and accordingly outputs a voltage signal for driving a motor.

In such electric power assisted steering systems, an appropriate control logic according to friction change is required. However, there is a problem in that a control logic according to the change of friction due to road conditions, the limitation of hardware, etc. is complicated, and appropriate tuning is required according to a vehicle. In addition, a tuned friction control logic also has a problem in that it takes a fixed operation rather than a more adaptive operation in response to changes in road conditions or the like. There is a need for a lightweight friction control logic that can adapt to disturbances or changes in key factors that reduce a steering feeling and can maintain constant performance and steering feeling by continuously and smoothly controlling them.

Prior art document: US patent publication No. US2010/0198461 (publication date: Aug. 5, 2010)

DETAILED DESCRIPTION OF THE INVENTION

Technical Problem

The present invention has been made in an effort to solve the above problems and an object of the present invention is to provide a motor control logic that can implement a good steering feeling and can respond appropriately to friction changes. In particular, the present invention provides a motor control method for an electric power assisted steering system that can improve steering feeling by removing amplitude components that are too large in determining a high frequency assist torque.

Technical Solution

A motor control method for controlling a motor of an electric power assisted steering system according to an embodiment of the present invention includes: generating a low pass torque signal and a high pass torque signal by a band pass filter using a detected input steering torque signal and a vehicle speed, respectively; generating a low frequency assist torque signal using the low pass torque signal and the vehicle speed; generating a high frequency assist torque signal using the high pass torque signal and the vehicle speed; generating a torque command signal using the sum of the low frequency assist torque signal and the high frequency assist torque signal; and generating a voltage output signal for driving the motor using the torque command signal. In the generating the high frequency torque signal, the high frequency assist torque signal is calculated as a product of the high pass torque signal and a final high frequency assist gain. The final high frequency assist gain is set to a basic high frequency assist gain basically determined by the vehicle speed, and is set to a value obtained by selectively multiplying the basic high frequency assist gain by a gain reflecting factor according to a magnitude of an amplitude of the high pass torque signal.

The gain reflecting factor may be determined as a function of the vehicle speed and the frequency.

The generating of the high frequency assist torque signal may include: calculating an amplitude difference which is a difference between an amplitude of the high pass torque signal and a reference amplitude for each of predetermined representative frequencies; determining whether the calculated amplitude difference is greater than or equal to a preset amplitude difference threshold for each representative frequency; setting the basic high frequency assist gain to the final high frequency assist gain when the calculated amplitude difference is not greater than or equal to the preset amplitude difference threshold for each representative frequency; setting the final high frequency assist gain to a value obtained by multiplying the basic high frequency assist gain by the gain reflecting factor when the calculated amplitude difference is greater than or equal to the preset amplitude difference threshold for each representative frequency; and determining the high frequency assist torque signal by a value obtained by multiplying the high pass torque signal by the final high frequency assist gain.

The reference amplitude for each representative frequency may be preset for the vehicle speed and the representative frequency by tuning.

The amplitude difference threshold value for each representative frequency may be preset for the vehicle speed and the representative frequency by tuning.

The gain reflecting factor may be preset for the vehicle speed and each representative frequency by tuning.

The gain reflecting factor may be set to a value of 1 or less.

A motor control apparatus for controlling a motor of an electric power assisted steering system according to an embodiment of the present invention includes: a torque sensor for sensing an input torque signal indicative of an input torque; a band pass filter configured to generate a low pass torque signal and a high pass torque signal using the sensed input torque signal and a vehicle speed, respectively; a low frequency assist circuit for generating a low frequency assist torque signal using the low pass torque signal and the vehicle speed; a high frequency assist circuit for generating a high frequency assist torque signal using the high pass torque signal and the vehicle speed; a summation circuit for summing the low frequency assist torque signal and the high frequency assist torque signal to generate a torque assist signal, and a variable notch filter generating a torque command signal using the torque assist signal. The high frequency assist circuit generates the high frequency assist torque signal as a product of the high pass torque signal and a final high frequency assist gain. The final high frequency assist gain is set to a basic high frequency assist gain basically determined by the vehicle speed, and is set to a value obtained by selectively multiplying the basic high frequency assist gain by a gain reflecting factor according to a magnitude of an amplitude of the high pass torque signal.

The high frequency assist circuit may be configured to perform: calculating an amplitude difference which is a difference between an amplitude of the high pass torque signal and a reference amplitude for each of predetermined representative frequencies; determining whether the calculated amplitude difference is greater than or equal to a preset amplitude difference threshold for each representative frequency; setting the basic high frequency assist gain to the final high frequency assist gain when the calculated amplitude difference is not greater than or equal to the preset amplitude difference threshold for each representative frequency; setting the final high frequency assist gain to a value obtained by multiplying the basic high frequency assist gain by the gain reflecting factor when the calculated amplitude difference is greater than or equal to the preset amplitude difference threshold for each representative frequency; and determining the high frequency assist torque signal by a value obtained by multiplying the high pass torque signal by the final high frequency assist gain.

The high frequency assist circuit may include: an amplitude difference calculating circuit that calculates an amplitude difference that is a difference between an amplitude of the high pass torque signal and a reference amplitude for each representative frequency preset; a comparator for determining whether the calculated amplitude difference is equal to or greater than a preset amplitude difference threshold for each representative frequency; and a final high frequency assist gain calculating circuit for calculating the final high frequency assist gain for calculating the high frequency assist torque signal. The final high frequency assist gain calculating circuit may set the basic high frequency assist gain as the final high frequency assist gain when the calculated amplitude difference is not greater than or equal to the preset amplitude difference threshold for each representative frequency, and may set a value obtained by multiplying the basic high frequency assist gain by the gain reflection factor as the final high frequency assist gain when the calculated amplitude difference is greater than or equal to the amplitude difference threshold for each representative frequency.

Effects of the Invention

According to the present invention, it is possible to appropriately cope with the change in friction through tuning. In addition, by using the gain reflecting factor in determining the high frequency assist torque, it is possible to remove an amplitude component that is too large, thereby improving a steering feeling.

BRIEF DESCRIPTION OF DRAWINGS

FIG. 1 is a schematic diagram of an electric power assisted steering system to which a motor control method according to an embodiment of the present invention can be applied.

FIG. 2 shows a torque control algorithm of a motor control method for an electric power assisted steering system according to an embodiment of the present invention.

FIG. 3 shows a high frequency assist circuit of a motor control method for an electric power assisted steering system according to an embodiment of the present invention.

FIG. 4 shows an example of a cut-off frequency table having cut-off frequencies for respective vehicle speeds used in a motor control method for an electric power assisted steering system according to an embodiment of the present invention.

FIG. 5 shows an example of an amplitude table for respective frequency bands having a threshold frequency for respective frequency bands used in a motor control method for an electric power assisted steering system according to an embodiment of the present invention.

FIG. 6 shows an example of an amplitude difference threshold value table for respective frequency bands having amplitude difference threshold values for respective frequency bands used in a motor control method for an electric power assisted steering system according to an embodiment of the present invention.

FIG. 7 shows an example of a gain reflecting factor table for respective frequencies bands having gain reflecting factors for respective frequency bands used in a motor control method for an electric power assisted steering system according to an embodiment of the present invention.

FIG. 8 is a graph of an example of amplitudes for a frequency of an input torque signal.

DETAILED DESCRIPTION OF THE EMBODIMENTS

Embodiments of the present invention will be described in detail with reference to the accompanying drawings.

Referring to FIG. 1, an electric power assisted steering system 10 includes a steering wheel 12 connected to an input steering shaft 11. The input steering shaft 11 may be connected to an output steering shaft 14 via a torsion bar 13. The steering torque applied through the steering wheel 12 is transmitted to the output steering shaft 14 through the input steering shaft 11 and the torsion bar 13, and the torsion bar 13 is configured to be able to be twisted to allow relative rotation between the input steering shaft 11 and the output steering shaft 14.

A position sensor 20 detects a relative rotational position between the input steering shaft 11 and the output steering shaft 14. The position sensor 20 forms a torque sensor together with the torsion bar 13. The torque sensor transmits an input torque signal $t_{app}$ to a torque signal processor 21. When the steering wheel 12 is rotated, the relative rotation angle between the input steering shaft 11 and the output steering shaft 14 changes according to the input torque applied to the steering wheel 12. The torque signal processor 21 monitors the relative rotation angle between the input steering shaft 11 and the output steering shaft 14 based on the input torque signal, and may output an input steering torque $t_s$ using the applied torque signal $t_{app}$ and the physical features (e.g., spring constant) of the torsion bar 13.

The output steering shaft 14 may be connected to a pinion gear 31 constituting a steering gear box, and the pinion gear 31 may be engaged with a rack gear of a rack bar 32. Pivoting behaviors of wheels 33 connected thereto may be achieved by lateral movements of the rack bar 32.

An electric motor 40 for providing steering assist may be connected to the rack bar 32 to provide a force for causing the lateral movement of the rack bar 32. The electric motor 40 may be connected to the rack bar 32 to transmit force to the rack bar 32 in a manner known in the art. Meanwhile, the electric motor 40 may be installed on the output steering shaft 14 rather than the rack bar 32 to provide steering assist.

The electric motor 40 may be various kinds of motors known in the art. For example, the electric motor 40 may be a permanent magnet AC motor (PMAC motor), and the magnitude and the direction of torque generated by the electric motor 40 may be determined by the magnitude and the direction of the current applied to a rotor coil. Hereinafter, a case where the electric motor 40 is a permanent magnet AC motor will be described.

A rotor position sensor 50 senses the position of a rotor relative to a stator of the electric motor 40, and outputs a rotor position signal 8, which is a value indicating a relative position between the rotor and the stator.

The electric power assisted steering system 10 according to an embodiment of the present invention includes an electronic control unit (ECU) 60. The ECU 60 may include a microprocessor, a memory and associated hardware and software and may be programmed to perform the steering assist logic described below.

The ECU 60 may be connected to a driving circuit 70, which is an electric circuit for driving the electric motor 40, and the driving circuit 70 may be connected to a vehicle electric power device 71. The vehicle electric power device 71 may include a battery, a electric power supply, a relay, and the like, and may provide an electric power source for driving the electric motor 40. The ECU 60 provides a voltage output signal $v_{out}$ to the drive circuit 70, and the drive circuit 70 outputs a motor current $i_m$ depending on the voltage output signal $v_{out}$.

A voltage/current monitoring device 80 monitors the motor current $i_m$ applied to the electric motor 40 and outputs a corresponding measured motor current signal $i_{mea}$.

A vehicle speed sensor 91 provides a vehicle speed signal v indicating the vehicle speed to the ECU 60, and additional inputs for a steering assist control may also be provided to the ECU 60.

The ECU 60 may include a control algorithm for a steering assist control, and the control algorithm may include a torque control algorithm 61, a motor control algorithm 62 and a current control algorithm 63. The control algorithm may be implemented in the form of software or electric circuit.

The torque control algorithm 61 outputs a required torque command $t_{cmd}$. The required torque command signal $t_{cmd}$ represents the magnitude of the steering assist torque required by the electric motor 40, and the required torque command $t_{cmd}$ may be generated based on the detected input steering torque $t_s$ and the detected vehicle speed v. The required torque command $t_{cmd}$ is then provided to the motor control algorithm 62.

The motor control algorithm 62 may determine a motor current command $i_{cmd}$ and the dq current advance angle δ. The motor current command $i_{cmd}$ indicates the magnitude of the current to be applied to the electric motor 40. The dq current advancing angle δ represents the angle of rotation of the motor current with respect to the q-axis on which the motor operates and can be determined as a function of a motor speed. The motor current command $i_{cmd}$ and the dq current advancing angle δ may be determined based on the required torque command $t_{cmd}$ and a rotor speed ω which is calculated by the detected rotor position θ. The measured motor current signal $i_{mea}$ and the detected rotor position θ can also be provided to the motor control algorithm 62 for the purposes of feedback and monitoring. The motor control algorithm 62 provides the motor current command $i_{cmd}$ and the dq current advancing angle δ to the current control algorithm 63.

The current control algorithm 63 serves to determine the output voltage signal $v_{out}$. The output voltage signal $v_{out}$ represents the voltage applied to each phase of the PMAC electric motor 40 and may be determined based on the motor current command $i_{cmd}$, the dq current forward angle δ and the detected rotor position θ. The measured motor current signal $i_{mea}$ may be supplied to the motor control algorithm 62 and the current control algorithm 63.

Hereinafter, an example of a method of determining the required torque command $t_{cmd}$ will be described with reference to FIG. 2. Referring to FIG. 2, the torque control algorithm 61 generates the required torque command $t_{cmd}$ using the detected input steering torque $t_s$ and the detected vehicle speed v. The detected input steering torque $t_s$ is supplied to a band pass filter 621. The band pass filter 621 may be designed by measuring an open loop transfer function that is a function of a vehicle speed, and may be designed to meet stability and performance requirements for all vehicle speeds. The band pass filter 621 may also be designed to meet the required performance, the gain stability margin, and the phase stability margin.

In detail, the band pass filter 621 may include a low pass filter 622 and a high pass filter 623. The low pass filter 622 passes components having a frequency smaller than the cut-off frequency $\omega_c$ among the detected steering torque signals and blocks the remaining signals. The high pass filter 623 passes components having a frequency greater than the cut-off frequency $\omega_c$ among the detected steering torque signals and blocks the remaining signals. Here, the cut-off frequency $\omega_c$ may be determined as a function of the vehicle speed v by a cut-off frequency determination function 624. The cut-off frequency $\omega_c$ may be determined using a lookup table having the cut-off frequency data according to the respective vehicle speeds or may be determined by a predetermined equation as a function of the vehicle speed. In this case, the low pass filter 622 and the high pass filter 623 may be set such that the sum thereof is one. The low pass filter 622 may be a primary filter having a pole at a cut-off frequency, and the high pass filter 623 may be determined such that the sum with the low pass filter 622 becomes one.

For example, as exemplarily shown in FIG. 4, the cut-off frequency may be determined using a lookup table having a cut-off frequency $\omega_c$ according to the vehicle speed v. In this case, the cut-off frequency $\omega_c$ may be set to have a value that gradually increases as the vehicle speed v increases.

The low pass filter 622 supplies a low pass torque signal $t_{sL}$ to a low frequency assist circuit 625. The low frequency assist circuit 625 generates a low frequency assist torque signal $t_{asLF}$ having a value associated with the low pass torque signal $t_{sL}$ and the detected vehicle speed v.

Meanwhile, the high pass filter 623 generates a high pass torque signal $t_{sH}$ using the detected input steering torque $t_s$ and the cut-off frequency $\omega_c$ and supplies the generated high pass torque signal $t_{sH}$ to a high frequency assist circuit 626. The high frequency assist circuit 626 determines a high frequency assist gain and generates a high frequency assist torque signal $t_{asHF}$ using the determined high frequency assist gain, the high pass torque signal $t_{sH}$ and the vehicle speed v.

The calculation of the high frequency assist torque signal $t_{asHF}$ by the high frequency assist gain determination algorithm 626 will be described with reference to FIG. 3.

Referring to FIG. 3, an amplitude difference calculating circuit 631 calculates an amplitude difference $m_a$ which is a difference between an amplitude of the high pass torque signal $t_{sH}$ and a representative frequency reference amplitude $m_{ref}$. The reference amplitude may be determined from the amplitude table 632 for respective representative frequency using the input vehicle speed v. Referring to FIG. 5, the representative frequency amplitude table 632 may include a representative frequency reference amplitude $m_{ref}$ preset for respective representative frequency in a plurality of vehicle speeds (or vehicle speed sections). In FIG. 5, a case in which a representative frequency includes a lower frequency, a middle frequency and an upper frequency is exemplary shown, and these representative frequencies may be representative values (for example, a frequency having an average amplitude value or a center frequency of a corresponding section) of respective frequency sections divided by a predetermined number in the frequency spectrum of the high pass torque signal. The frequency amplitude table 632 for respective vehicle speed may be determined through tuning in an individual vehicle. For example, the reference amplitude for each representative frequency may be set such that the amplitude gradually decreases in the form of an exponential function as the frequency increases at an individual vehicle speed. In FIG. 5, four vehicle speed sections and three representative frequencies are exemplarily illustrated, but the numbers of the vehicle speed section and the representative frequency are not limited thereto.

A comparator 633 determines whether the amplitude difference $m_d$ calculated by the amplitude difference calculation circuit 631 is equal to or greater than the amplitude difference threshold value $m_{dc}$. In this case, the amplitude difference threshold value $m_{dc}$ may be determined from the amplitude difference threshold table 634 for respective representative frequency using the input vehicle speed v. Referring to FIG. 6, the amplitude difference threshold table 634 may include amplitude difference thresholds preset for each representative frequency in a plurality of vehicle speeds (or vehicle speed sections).

FIG. 6 exemplarily illustrates a case where the representative frequency includes a lower frequency, a middle frequency and an upper frequency, and these representative frequencies may be representative values (for example, a frequency having an average amplitude value or a center frequency of a corresponding section) of respective frequency sections divided by a predetermined number in the frequency spectrum of the high pass torque signal. The representative amplitude difference threshold table 634 for respective representative frequency may be determined through tuning in an individual vehicle. For example, the threshold value may be set to a value that seems to have a significant influence on steering feeling due to an increase in amplitude at the frequency in the corresponding frequency band. In FIG. 6, four vehicle speed sections and three representative frequencies are exemplarily illustrated, but the numbers of the vehicle speed section and the representative frequency are not limited thereto.

When it is determined by the comparator 633 that the amplitude difference $m_d$ is not equal to or greater than the amplitude difference threshold value $m_{dc}$, the basic high frequency assist gain $g_H$ is used as the final high frequency assist gain $g_{Hf}$. On the other hand, when it is determined by the comparator 633 that the amplitude difference $m_d$ is greater than or equal to the amplitude difference threshold value $m_{dc}$, the value obtained by multiplying the basic high frequency assist gain $g_H$ by the gain reflecting factor $f_g$ is used as the final high frequency assist gain $g_{Hf}$. The value obtained by multiplying the final high frequency assist gain $g_{Hf}$ by the high pass torque signal $t_{sH}$ becomes the high frequency assist torque signal $t_{asHF}$ of FIG. 2.

Specifically, referring to FIG. 3, the final high frequency assist gain calculating circuit 635 calculates the final high frequency assist gain $g_{Hf}$ according to the determination result of the comparator 633. First, when the determination result in the comparator 633 is negative (No), that is, when the amplitude difference $m_d$ ds not equal to or larger than the amplitude difference threshold value $m_{dc}$, the final high frequency assist gain $g_{Hf}$ is set as the basic high frequency assist gain $g_H$ calculated at the high frequency assist gain table 636 is set, so that the high frequency assist torque signal $t_{asHF}$ is a value obtained by multiplying the high pass torque signal $t_{sH}$ by the basic high frequency assist gain $g_H$. On the other hand, when the determination result in the comparator 633 is affirmative (Yes), that is, when the amplitude difference $m_d$ is greater than or equal to the amplitude difference threshold value $m_{dc}$, the final high frequency assist gain $g_{Hf}$ is set as a value obtained by multiplying the basic high frequency assist gain $g_H$ calculated at the high frequency assist gain table 636 by the gain reflecting factor $f_g$ for the representative frequency determined in the gain reflecting factor table 637 for each representative frequency, and accordingly the high frequency assist torque signal $t_{aSHF}$ is set as a value obtained by multiplying the high pass torque signal $t_{sH}$ by the basic high frequency assist gain $g_H$ and the gain reflecting factor $f_g$ for each representative frequency.

The high frequency assist gain table 636 is configured to receive the vehicle speed v and to set the basic high frequency assist gain $g_H$ according thereto, and may be set in a conventionally known manner for determining the high frequency assist gain according to the vehicle speed. Since this is the same as the prior art, a detailed description thereof will be omitted.

FIG. 7 shows an example of a gain reflecting factor table 637 for respective representative frequency. In FIG. 7, a case in which a representative frequency includes a lower frequency, a middle frequency and an upper frequency is exemplarily shown, and these representative frequencies may be representative values (for example, a frequency having an average amplitude value or a center frequency of a corresponding section) of respective frequency sections divided by a predetermined number in the frequency spectrum of the high pass torque signal. The specific gain reflecting factor table 637 for respective representative frequency may be determined through tuning in an individual vehicle. For example, the gain reflecting factor may be set such that the amplitude distribution over frequency tends to decrease in the form of an exponential function. In FIG. 7, four vehicle speed sections and three representative frequencies are shown as examples, but the numbers of the vehicle speed section and the representative frequency are not limited thereto. At this time, the gain reflection factor $f_g$ can be set to a value of 1 or less, thereby reducing the amplitude of the signal having an amplitude component that is too large in the high pass torque signal $t_{sH}$, thereby improving steering feeling. For example, when the high pass torque signal $t_{sH}$ at a specific vehicle speed is as shown in FIG. 8, the amplitude of the portion indicated in the dotted line is relatively large, and the gain reflecting factor $f_g$ is reflected on such a component so that the magnitude of the torque signal can be reduced.

Referring back to FIG. 2, a summation circuit 627 calculates the torque assist signal $t_{as}$ by summing the low frequency assist torque signal $t_{asLF}$ and the high frequency assist torque signal $t_{asHF}$. The calculated torque assist signal $t_{as}$ may be filtered by a variable notch filter 628 and can be then calculated as a torque command signal $t_{cmd}$. For example, the variable notch filter 628 may be configured to variably remove frequency components of a specific band according to the vehicle speed, and a known variable notch filter may be used.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to a control of a motor of an electric power assisted steering system of vehicles, so it has an industrial applicability.

The invention claimed is:

1. A motor control method for controlling a motor of an electric power assisted steering system comprising:
   generating a low pass torque signal and a high pass torque signal by a band pass filter using a detected input steering torque signal and a vehicle speed, respectively;
   generating a low frequency assist torque signal using the low pass torque signal and the vehicle speed;
   generating a high frequency assist torque signal using the high pass torque signal and the vehicle speed;
   generating a torque command signal using the sum of the low frequency assist torque signal and the high frequency assist torque signal; and
   generating a voltage output signal for driving the motor using the torque command signal,
   wherein in the generating the high frequency torque signal, the high frequency assist torque signal is calculated as a product of the high pass torque signal and a final high frequency assist gain, and
   wherein the final high frequency assist gain is set to a basic high frequency assist gain basically determined by the vehicle speed, and is set to a value obtained by selectively multiplying the basic high frequency assist gain by a gain reflecting factor according to a magnitude of an amplitude of the high pass torque signal.

2. The motor control method of claim 1, wherein the gain reflecting factor is determined as a function of the vehicle speed and the frequency.

3. The motor control method of claim 1, wherein the generating of the high frequency assist torque signal comprises:
   calculating an amplitude difference which is a difference between an amplitude of the high pass torque signal and a reference amplitude for each of predetermined representative frequencies;
   determining whether the calculated amplitude difference is greater than or equal to a preset amplitude difference threshold for each representative frequency;
   setting the basic high frequency assist gain to the final high frequency assist gain when the calculated amplitude difference is not greater than or equal to the preset amplitude difference threshold for each representative frequency;
   setting the final high frequency assist gain to a value obtained by multiplying the basic high frequency assist gain by the gain reflecting factor when the calculated amplitude difference is greater than or equal to the preset amplitude difference threshold for each representative frequency; and
   determining the high frequency assist torque signal by a value obtained by multiplying the high pass torque signal by the final high frequency assist gain.

4. The motor control method of claim 3, wherein the reference amplitude for each representative frequency is preset for the vehicle speed and the representative frequency by tuning.

5. The motor control method of claim 3, wherein the amplitude difference threshold value for each representative frequency is preset for the vehicle speed and the representative frequency by tuning.

6. The motor control method of claim 3, wherein the gain reflecting factor is preset for the vehicle speed and each representative frequency by tuning.

7. The motor control method of claim 1, wherein the gain reflecting factor is set to a value of 1 or less.

8. A motor control apparatus for controlling a motor of an electric power assisted steering system comprising:
   a torque sensor for sensing an input torque signal indicative of an input torque;
   a band pass filter configured to generate a low pass torque signal and a high pass torque signal using the sensed input torque signal and a vehicle speed, respectively;
   a low frequency assist circuit for generating a low frequency assist torque signal using the low pass torque signal and the vehicle speed;
   a high frequency assist circuit for generating a high frequency assist torque signal using the high pass torque signal and the vehicle speed;
   a summation circuit for summing the low frequency assist torque signal and the high frequency assist torque signal to generate a torque assist signal, and
   a variable notch filter generating a torque command signal using the torque assist signal,
   wherein the high frequency assist circuit generates the high frequency assist torque signal as a product of the high pass torque signal and a final high frequency assist gain, and
   wherein the final high frequency assist gain is set to a basic high frequency assist gain basically determined by the vehicle speed, and is set to a value obtained by selectively multiplying the basic high frequency assist gain by a gain reflecting factor according to a magnitude of an amplitude of the high pass torque signal.

9. The motor control apparatus of claim 8, wherein the gain reflecting factor is determined as a function of the vehicle speed and the frequency.

10. The motor control apparatus of claim 8, wherein the high frequency assist circuit is configured to perform:
    calculating an amplitude difference which is a difference between an amplitude of the high pass torque signal and a reference amplitude for each of predetermined representative frequencies;
    determining whether the calculated amplitude difference is greater than or equal to a preset amplitude difference threshold for each representative frequency;
    setting the basic high frequency assist gain to the final high frequency assist gain when the calculated amplitude difference is not greater than or equal to the preset amplitude difference threshold for each representative frequency;
    setting the final high frequency assist gain to a value obtained by multiplying the basic high frequency assist gain by the gain reflecting factor when the calculated amplitude difference is greater than or equal to the preset amplitude difference threshold for each representative frequency; and determining the high frequency assist torque signal by a value obtained by multiplying the high pass torque signal by the final high frequency assist gain.

11. The motor control apparatus of claim 8, wherein the high frequency assist circuit comprises: an amplitude difference calculating circuit that calculates an amplitude difference that is a difference between an amplitude of the high pass torque signal and a reference amplitude for each representative frequency preset;
  a comparator for determining whether the calculated amplitude difference is equal to or greater than a preset amplitude difference threshold for each representative frequency; and
  a final high frequency assist gain calculating circuit for calculating the final high frequency assist gain for calculating the high frequency assist torque signal, and
  wherein the final high frequency assist gain calculating circuit sets the basic high frequency assist gain as the final high frequency assist gain when the calculated amplitude difference is not greater than or equal to the preset amplitude difference threshold for each representative frequency, and sets a value obtained by multiplying the basic high frequency assist gain by the gain reflection factor as the final high frequency assist gain when the calculated amplitude difference is greater than or equal to the amplitude difference threshold for each representative frequency.

12. The motor control apparatus of claim 11, wherein the reference amplitude for each representative frequency is preset for the vehicle speed and the representative frequency by tuning.

13. The motor control apparatus of claim 11, wherein the amplitude difference threshold value for each representative frequency is preset for the vehicle speed and the representative frequency by tuning.

14. The motor control apparatus of claim 11, wherein the gain reflecting factor is preset for the vehicle speed and each representative frequency by tuning.

15. The motor control apparatus of claim 11, wherein the gain reflecting factor is set to a value of 1 or less.

* * * * *